United States Patent
Shin

(10) Patent No.: US 10,274,073 B1
(45) Date of Patent: Apr. 30, 2019

(54) OIL PRESSURE SUPPLY SYSTEM OF AUTOMATIC TRANSMISSION

(71) Applicants: Hyundai Motor Company, Seoul (KR); Kia Motors Corporation, Seoul (KR)

(72) Inventor: Yong Uk Shin, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/951,992

(22) Filed: Apr. 12, 2018

(30) Foreign Application Priority Data

Dec. 28, 2017 (KR) .................. 10-2017-0182956

(51) Int. Cl.
*F16H 61/00* (2006.01)
*F16H 57/04* (2010.01)
*F01M 1/16* (2006.01)
*F01M 1/02* (2006.01)

(52) U.S. Cl.
CPC ........... *F16H 57/0413* (2013.01); *F01M 1/16* (2013.01); *F16H 57/0435* (2013.01); *F16H 61/0031* (2013.01); *F01M 2001/0215* (2013.01); *F16H 2061/0037* (2013.01)

(58) Field of Classification Search
CPC ............. F16H 57/0413; F16H 61/0031; F16H 57/0435; F16H 2061/0037; F01M 1/16; F01M 2001/0215
See application file for complete search history.

(56) References Cited

U.S. PATENT DOCUMENTS

| 2014/0060679 | A1* | 3/2014 | Wi ........................... F01M 1/16 137/565.3 |
| 2015/0360675 | A1* | 12/2015 | Nefcy ................. F16H 61/0031 701/22 |
| 2016/0121707 | A1* | 5/2016 | Yamamoto .......... F16H 57/0413 180/65.22 |

FOREIGN PATENT DOCUMENTS

| JP | 2005-030495 A | 2/2005 |
| JP | 5262653 B2 | 8/2013 |
| JP | 2015-086771 A | 5/2015 |

* cited by examiner

*Primary Examiner* — David J Hlavka
(74) *Attorney, Agent, or Firm* — Morgan, Lewis & Bockius LLP

(57) ABSTRACT

An oil pressure supply system of automatic transmission may include mechanical oil pump discharging the pumped oil pressure to line pressure passage, line regulator valve controlling the oil pressure of the line pressure passage and supplying the controlled oil pressure to first passage, line regulator valve controlling the oil pressure of the first passage and supplying the controlled oil pressure to second and third passages, torque converter lock-up clutch control valve changing over passage to supply the oil pressure of the second passage and supply the oil pressure through the third passage to cooling/lubrication portion through sixth passage, electric oil pump discharging the oil to seventh passage, first switch valve to selectively opening the oil pressure supplied to eighth passage, second switch valve selectively supplying some of the oil pressure supplied to the eighth passage to the cooling/lubrication portion through ninth passage, and four solenoid valves for controlling the valves.

14 Claims, 5 Drawing Sheets

OIL PRESSURE SUPPLY SYSTEM OF AUTOMATIC TRANSMISSION

CROSS-REFERENCE TO RELATED APPLICATION

The present application claims priority to Korean Patent Application No. 10-2017-0182956 filed on Dec. 28, 2017, the entire contents of which is incorporated herein for all purposes by this reference.

BACKGROUND OF THE INVENTION

Field of the Invention

The present invention relates to an oil pressure supply system of an automatic transmission for a vehicle, and more particularly, to an oil pressure supply system of an automatic transmission for a vehicle, which auxiliary applies an electric oil pump to reduce a load of a mechanical oil pump and improve fuel efficiency.

Description of Related Art

Recently, as global oil prices have been high and emission regulations have been strengthened, automakers have concentrating on developing technologies that can enhance fuel efficiency in an environmentally friendly way.

Improvement of the fuel efficiency in AN automatic transmission may be achieved through enhancement of power transmission efficiency and the power transmission efficiency enhancement may be implemented by minimizing unnecessary consumption power of an oil pump.

However, in the related art, since a system is configured, in which oil pressure pumped in a mechanical oil pump driven by power of an engine is controlled by a pressure control valve and supplied to each transmission device, flow rate cannot be controlled, and as a result, unnecessary power loss occurs.

There is a problem that power loss due to generation of unnecessary oil pressure in a high RPM region occurs, reducing the fuel efficiency.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an oil pressure supply system of an automatic transmission for a vehicle, which applies both a mechanical oil pump and an electric oil pump and auxiliary utilizes the electric oil pump to reduce a load of the mechanical oil pump and improve fuel efficiency.

Various aspects of the present invention are directed to providing an oil pressure supply system of an automatic transmission for a vehicle may include a mechanical oil pump driven by an engine, and pumping oil stored in a sump by high oil pressure and discharging the pumped oil pressure to a line pressure passage; a line regulator valve controlling the oil pressure supplied through the line pressure passage and supplying the controlled oil pressure to a first passage; a torque converter control valve controlling the oil pressure supplied through the first passage and supplying the controlled oil pressure to second and third passages; a torque converter lock-up clutch control valve changing over a passage to supply the oil pressure supplied through the second passage and supply the oil pressure through the third passage to a cooling/lubrication portion through a sixth passage; an electric oil pump pumping oil stored in the sump at high oil pressure and discharging the oil to a seventh passage; a first switch valve disposed on the seventh passage to selectively opening or closing the oil pressure supplied to an eighth passage; a second switch valve selectively supplying some of the oil pressure supplied to the eighth passage to the cooling/lubrication portion through a ninth passage; and four solenoid valves for controlling the valves, in which four solenoid valves for controlling the valves, the eighth passage is connected to the second passage through a second check valve, and the sixth passage is joined with the second passage and connected to the ninth passage through a third check valve.

The line regulator valve may be a spool valve and may be connected to be controlled by feedback oil pressure of the line pressure passage, which is applied to one end portion, and control pressure of the first solenoid valve and elastic force of an elastic member, which are applied to an opposite side against the feedback oil pressure of the line pressure passage.

The torque converter control valve may be the spool valve, and may be connected to control the oil pressure while recirculating some of the oil pressure supplied through the first passage to a suction passage of the mechanical oil pump through a recirculation passage so that a valve spool moves horizontally by the control pressure of the first solenoid valve, which is applied to one end portion, and the feedback oil pressure of the second passage, which is applied to the opposite side against the control pressure of the first solenoid valve.

The first solenoid valve may be an N/L type variable control solenoid valve in which the oil pressure is not formed in a normal state.

The torque converter lock-up clutch control valve may be the spool valve, and may be connected to be controlled by the control pressure of the second solenoid valve and the feedback oil pressure of the fifth passage, which are applied to one end portion and the oil pressure of the second passage and the elastic force of the elastic member, which are applied to the opposite side against the control pressure of the second solenoid valve and the feedback oil pressure of the fifth passage.

The second solenoid valve may be the N/L type variable control solenoid valve in which the oil pressure is not formed in the normal state.

The first switch valve may be the spool valve, and may be connected to be controlled by the control pressure of the third solenoid valve, which is applied to one end portion and the elastic force of the elastic member disposed at the opposite side against the control pressure of the third solenoid valve.

The third solenoid valve may be an N/L type on/off solenoid valve in which the oil pressure is not formed in the normal state.

The second switch valve may be the spool valve, and may be connected to be controlled by the control pressure of the fourth solenoid valve, which is applied to one end portion and the elastic force of the elastic member disposed at the opposite side against the control pressure of the fourth solenoid valve.

The fourth solenoid valve may be the N/L type on/off solenoid valve in which the oil pressure is not formed in the normal state.

Furthermore, the first check valve may be connected to permit only an oil pressure flow supplied from the seventh passage to the line pressure passage, the second check valve may be connected to permit only the oil pressure flow supplied from the eighth passage to the second passage, and the third check valve may be connected to permit only the oil pressure flow supplied from the sixth passage to the ninth passage.

An orifice may be disposed at a point on the second passage before the second passage and the eighth passage are joined to each other.

The second switch valve may be connected to selectively supply some of the oil pressure supplied to the seventh passage to the cooling/lubrication portion through the ninth passage.

Herein, the second switch valve may be the spool valve, and may be connected to be controlled by the control pressure of the fourth solenoid valve, which is applied to one end portion and the elastic force of the elastic member disposed at the opposite side against the control pressure of the fourth solenoid valve.

In the oil pressure supply system of an automatic transmission for a vehicle according to the exemplary embodiment of the present invention, during a flow rate insufficiency section of the mechanical oil pump by low-speed driving or when a driving load of the mechanical pump increases while the oil pressure is excessively generated from the mechanical oil pump due to high-speed driving, the driving load of the mechanical oil pump is reduced by recirculating some of the oil pressure supplied from the mechanical oil pump and insufficient oil pressure may be auxiliary supplied by driving the electric oil pump to stably supply the oil pressure and reduce driving loss of the mechanical oil pump, enhancing the fuel efficiency.

Furthermore, the oil pressure supply system of an automatic transmission for a vehicle according to the exemplary embodiment of the present invention assists the pressure of the torque converter by the oil pressure of the electric oil pump when the pressure of the torque converter is insufficient (medium RPM region and high-pressure region of the line pressure) to reduce a capacity of the mechanical oil pump, enhancing the fuel efficiency.

Furthermore, the oil pressure supply system of an automatic transmission for a vehicle according to the exemplary embodiment of the present invention may assist insufficient cooling and lubricating flow rate with the oil pressure of the electric oil pump when the control pressure and the pressure of the torque converter are formed, but the cooling and lubricating flow rate is insufficient to reduce the capacity of the mechanical oil pump, enhancing the fuel efficiency and enhancing durability of the automatic transmission.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
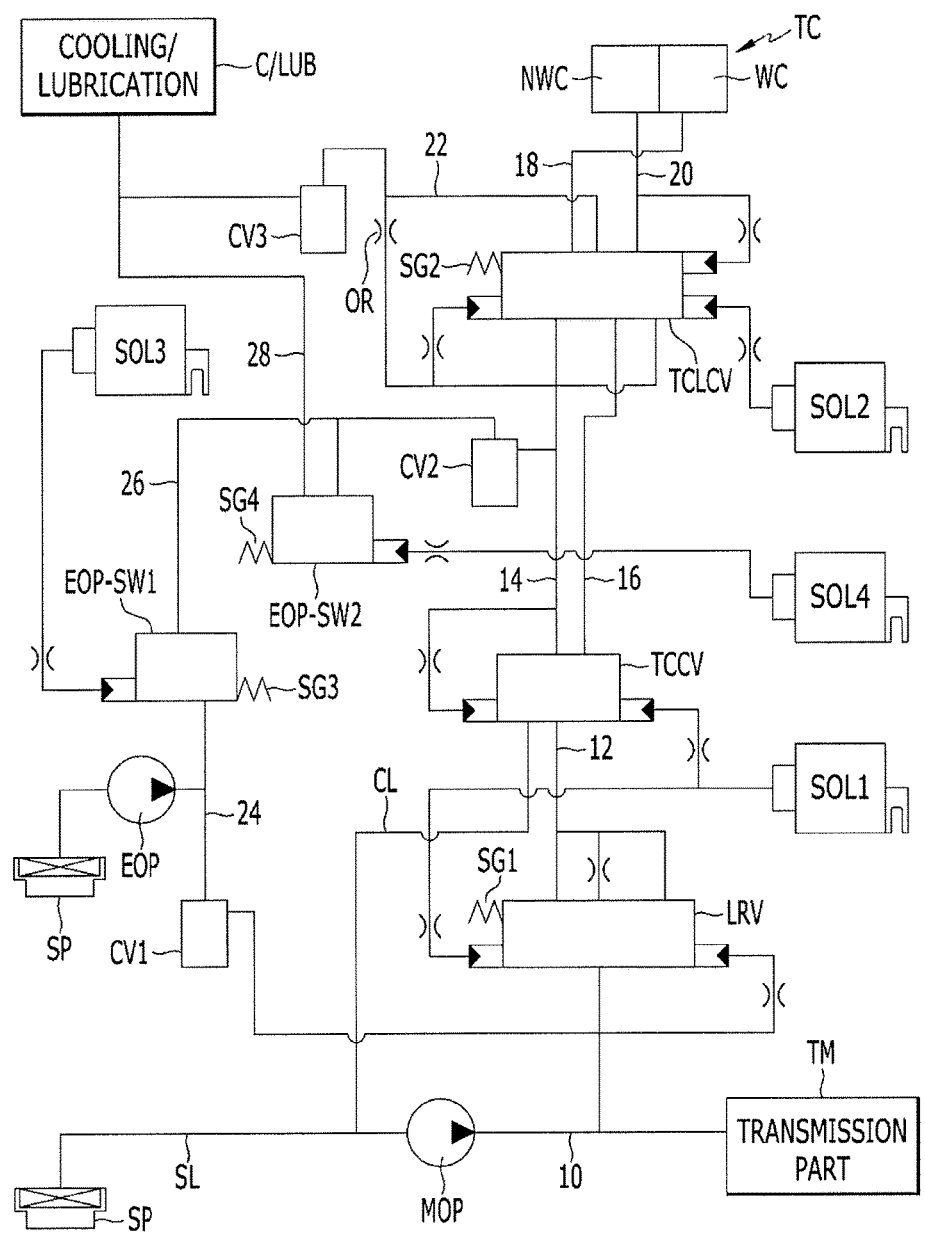
FIG. 1 is an oil pressure circuit diagram of an oil pressure supply system according to various exemplary embodiments of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in portion by the intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the contrary, the invention(s) is/are intended to cover not only the exemplary embodiments of the present invention, but also various alternatives, modifications, equivalents and other embodiments, which may be included within the spirit and scope of the invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

Parts not associated with description are omitted for clearly describing the present invention and like reference numerals designate like elements throughout the specification.

In the following description, dividing names of components into first, second and the like is to divide the names because the names of the components are the same as each other and an order thereof is not particularly limited.

FIG. 1 is an oil pressure circuit diagram of an oil pressure supply system according to various exemplary embodiments of the present invention.

Referring to FIG. 1, the oil pressure supply system according to the various exemplary embodiments of the present invention may include a mechanical oil pump MOP, an electric oil pump EOP, a line regulator valve LRV, a torque converter control valve TCCV, a torque converter lookup clutch control valve (TCLCV), first, second, third and fourth solenoids valves SOL1, SOL2, SOL3, and SOL4, and first, second, and third check valves CV1, CV2, and CV3 and oil pressure pumped from the mechanical oil pump MOP and the electric oil pump EOP may be supplied to a transmission portion TM, a torque converter TC, and a cooling and lubrication portion C/LUB.

The mechanical oil pump MOP is driven by an engine. When the engine is driven, the mechanical oil pump MOP is continuously driven to pump a fluid stored in a sump SP and discharge the pumped fluid to a line pressure pipe 10.

The line regulator valve LRV stably controls the oil pressure supplied through the line pressure line 10 and supplies the oil pressure to the transmission device TM and the torque converter control valve TCCV.

The line regulator valve LRV may be a spool valve in which a valve spool is embedded in a valve body to move horizontally to control an opening area of each port.

The line regulator valve LRV controls the oil pressure while the valve spool moves horizontally by feedback oil pressure of the line pressure passage, which is applied to one end portion, and control pressure of the first solenoid valve SOL1 and elastic force of the elastic member SG1, which are applied to an opposite side against the feedback oil pressure.

The torque converter control valve TCCV controls the oil pressure supplied from the line regulator valve LRV through a first passage 12 and supplies the controlled oil pressure to the torque converter lock-up clutch control valve TCLCV through second and third passages 14 and 16.

The torque converter control valve TCCV may be the spool valve in which the valve spool is embedded in the valve body to move horizontally to control the opening area of each port.

The torque converter control valve TCCV controls the oil pressure supplied through the first passage 12 while being controlled by the control pressure of the first solenoid valve SOL1, which is applied to one end portion and the feedback oil pressure of the second passage 14, which is applied to the opposite side against the control pressure of the first solenoid valve SOL1 and supplies the controlled oil pressure to the second and third passages 14 and 16.

In a control process of the torque converter control valve TCCV, the oil pressure is controlled while a portion of the oil pressure supplied through the first passage 12 is recirculated to a suction passage SL through a recirculation passage CL.

The torque converter lock-up clutch control valve TCLCV switches a passage to selectively supply the oil pressure from the torque converter control valve TCCV through the second and third passages 14 and 16 to a lock-up clutch operating side chamber WC or a lock-up clutch non-operating side chamber NWC through fourth and fifth passages 18 and 20 or supply the oil pressure to the cooling/lubrication portion C/LUB through a sixth passage 22.

The torque converter lock-up clutch control valve TCLCV may be the spool valve in which the valve spool is embedded in the valve body to move horizontally to control the opening area of each port.

The torque converter lock-up clutch control valve TCLCV supplies the oil pressure supplied through the second passage 14 to the lock-up clutch operating side chamber WC or the lock-up clutch non-operating side chamber NWC of the torque converter TC while the valve spool moves horizontally by the control pressure of the second solenoid valve and the feedback oil pressure of the fifth passage 20, which are applied to one end portion and the oil pressure of the second passage 14 and the elastic force of the elastic member SG2, which are applied to the opposite side against the control pressure of the second solenoid valve SOL2 and the feedback oil pressure or selectively supplies the oil pressure supplied through the third passage 16 to the cooling/lubrication portion C/LUB.

While the mechanical oil pump MOP is controlled by a transmission control device, the mechanical oil pump MOP pumps the fluid stored in the sump SP and discharges the pumped fluid to a seventh passage 24.

The seventh passage 24 is connected to the line pressure passage 10 through the first check valve CV1 and connected to a first switch valve EOP-SW1 through the first check valve CV1.

The first switch valve EOP-SW1 may be the spool valve in which the valve spool is embedded in the valve body to move horizontally.

The first switch valve EOP-SW1 is configured to supply the oil pressure supplied through the seventh passage 24 to the eighth passage 26 while the valve spool moves horizontally by the control pressure of the third solenoid valve SOL3 applied to one end portion and the elastic force of the elastic member SG3 disposed at the opposite side against the control pressure of the third solenoid valve SOL3.

The oil pressure supplied to the eighth passage 26 is supplied to the second passage 14 and supplied to a second switch valve EOP-SW2 through the second check valve CV2.

The second switch valve EOP-SW2 may be the spool valve in which the valve spool is embedded in the valve body to move horizontally.

The second switch valve EOP-SW2 is configured to supply the oil pressure supplied through the eighth passage 26 to the ninth passage 28 while the valve spool moves horizontally by the control pressure of the fourth solenoid valve SOL4 applied to one end portion and the elastic force of the elastic member SG4 disposed at the opposite side against the control pressure of the fourth solenoid valve SOL4.

The third check valve CV3 is disposed between a passage after the second passage 14 and the sixth passage 22 are joined and the ninth passage 28. An orifice OR is disposed at a point on the second passage 14 before the second passage 14 and the sixth passage 22 are coupled to control a flow rate which flows into the sixth passage 22 from the second passage 14.

The first check valve CV1 may permit only an oil pressure flow supplied from the seventh passage 24 to the line pressure passage 10. The second check valve CV2 may permit only the oil pressure flow supplied from the eighth passage 26 to the second passage 14. The third check valve CV3 may permit only the oil pressure flow supplied from the sixth passage 22 to the ninth passage 28.

Furthermore, the first and second solenoid valves SOL1 and SOL2 may be N/L type variable control solenoid valves. Furthermore, the third and fourth solenoid valves SOL3 and SOL4 may be N/L type on/off solenoid valves in which the oil pressure is not formed in a normal state.

Moreover, the transmission portion TM refers to a planetary gear train that forms a speed change stage in accordance with operating conditions. Shifting of the planetary gear train is made of according to a plurality of planetary gear sets as well-known in the art, a clutch which is a coupling component selectively connecting each rotary component of the planetary gear set or fixing each rotary component to a transmission housing, and the oil pressure supplied to a brake.

Figure 2:
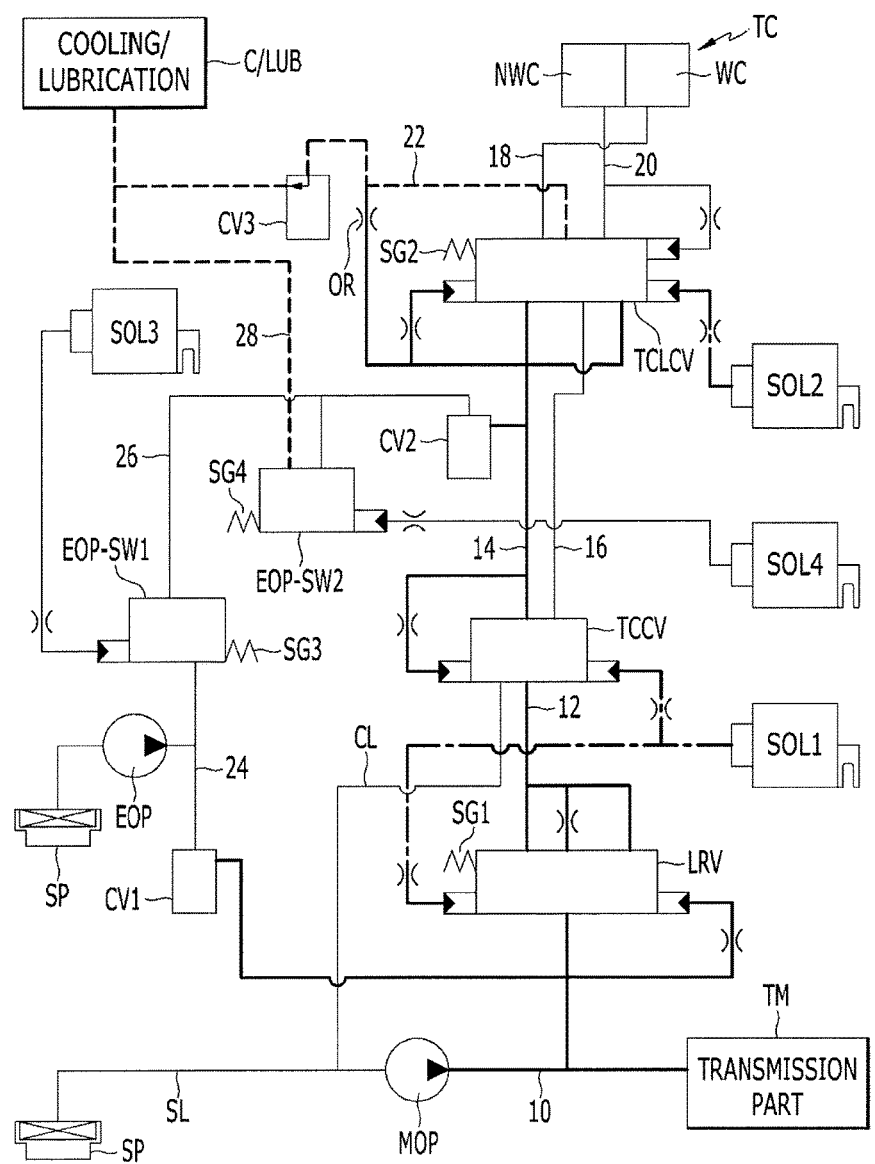
FIG. 2 is a flowchart of oil pressure when only a mechanical oil pump is driven in the oil pressure supply system according to the various exemplary embodiments of the present invention.

FIG. 2 is a flowchart of oil pressure when only a mechanical oil pump is driven in the oil pressure supply system according to the various exemplary embodiments of the present invention.

Referring to FIG. 2, the oil pressure pumped by the mechanical oil pump MOP is controlled to stable oil pressure by the line regulator valve LRV and the torque converter control valve TCCV.

The torque converter control valve TCCV supplies the oil pressure supplied from the line regulator valve LRV through the first passage 12 to the torque converter lock-up clutch control valve TCLCV through second and third passages 14 and 16 according to a control condition.

In the torque converter lock-up clutch control valve TCLCV, the oil pressure supplied from the torque converter control valve TCCV through the second and third passages 14 and 16 is supplied to the lock-up clutch operating side chamber WC or the lock-up clutch non-operating side chamber NWC according to the control condition.

Furthermore, the oil pressure supplied through the third passage 16 is selectively supplied to the cooling/lubrication portion C/LUB.

Figure 3:
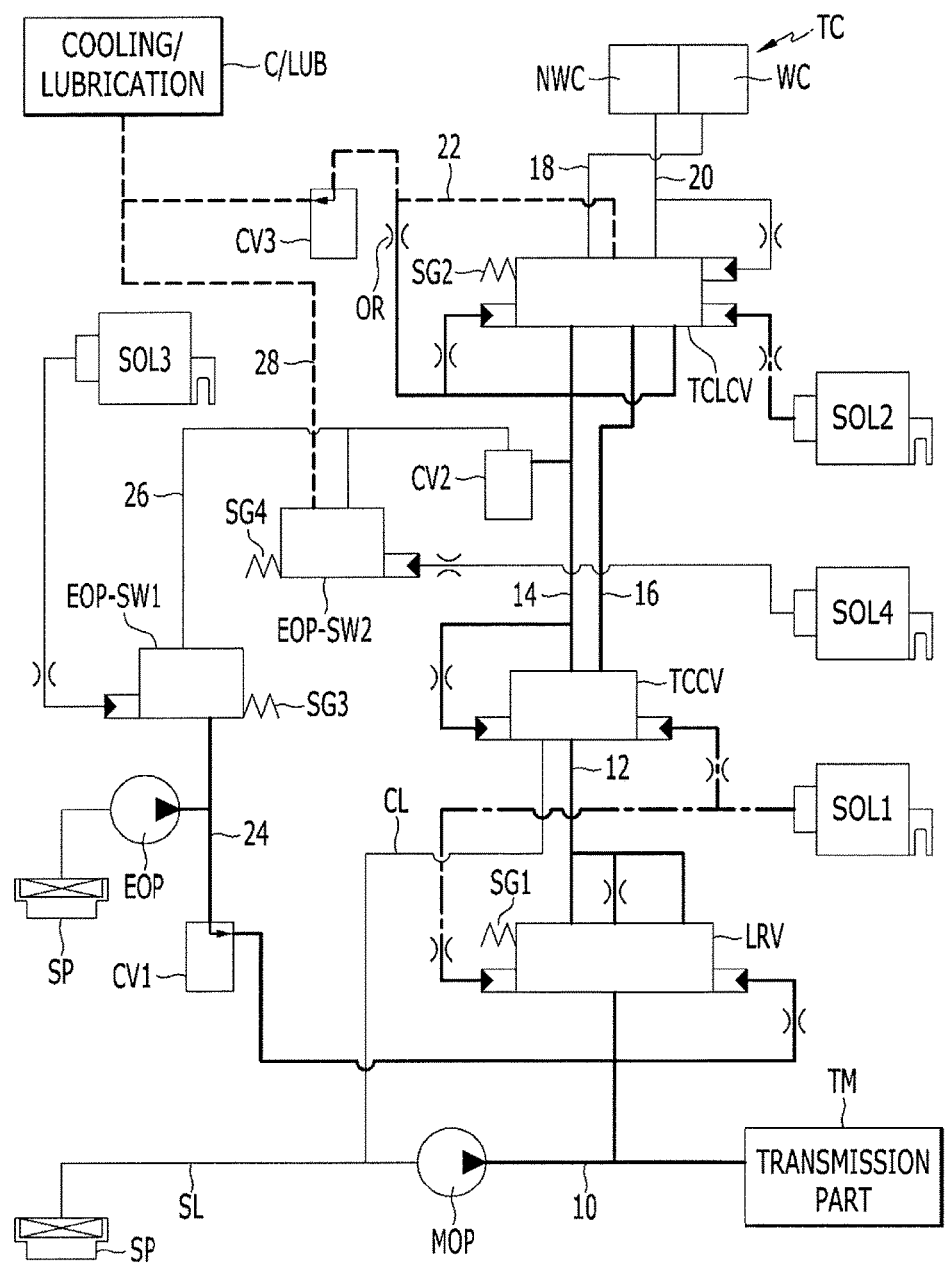
FIG. 3 is a flowchart of oil pressure when oil pressure of an electric oil pump is supplied as line pressure when the mechanical oil pump and the electric oil pump are simultaneously driven in the oil pressure supply system according to the various exemplary embodiments of the present invention.

FIG. 3 is a flowchart of oil pressure when oil pressure of an electric oil pump is supplied as line pressure while the mechanical oil pump and the electric oil pump are simultaneously driven in the oil pressure supply system according to the various exemplary embodiments of the present invention.

Referring to FIG. 3, when the flow rate supplied from the mechanical oil pump MOP is small due to a low speed operation in the oil pressure supply process illustrated in FIG. 2, the electric oil pump EOP is driven and controlled.

Furthermore, when the third solenoid valve SOL3 is controlled in an OFF state, the oil pressure generated by the electric oil pump EOP is supplied to the line pressure passage 10 through the first check valve CV1.

Accordingly, the oil pressure generated by the electric oil pump EOP assists the flow rate of the mechanical oil pump MOP so that sufficient oil pressure may be supplied to the line pressure passage 10 by assisting the flow rate of the mechanical oil pump MOP.

Figure 4:
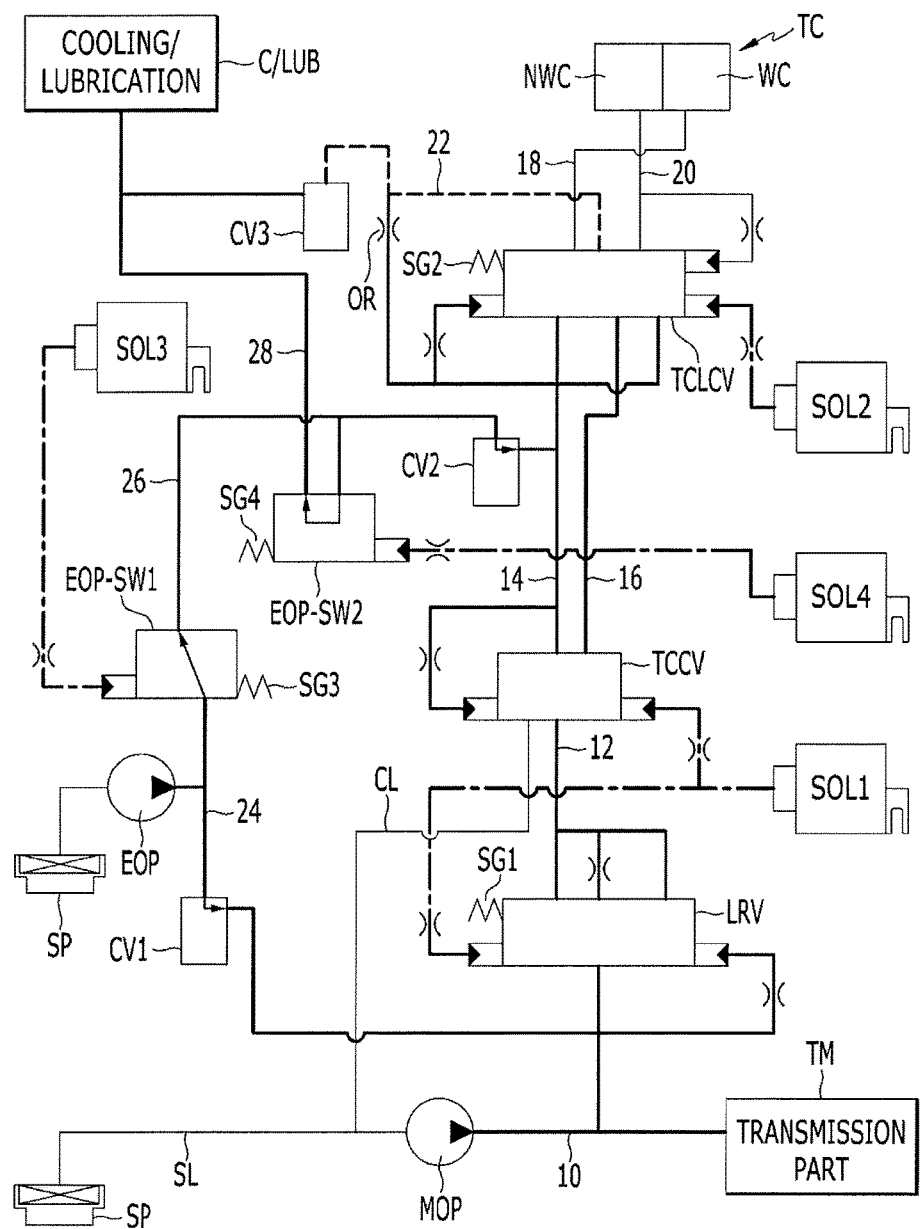
FIG. 4 is a flowchart of oil pressure when oil pressure of an electric oil pump is supplied as cooling and lubrication pressure when the mechanical oil pump and the electric oil pump are simultaneously driven in the oil pressure supply system according to the various exemplary embodiments of the present invention.

FIG. 4 is a flowchart of oil pressure when the oil pressure of the electric oil pump is supplied as the line pressure and a torque converter pressure and cooling/lubrication oil pressure while the mechanical oil pump and the electric oil pump are simultaneously driven in the oil pressure supply system according to the various exemplary embodiments of the present invention.

Referring to FIG. 4, during the oil pressure supply process illustrated in FIG. 3, when the oil pressure supplied to the torque converter and the cooling/lubricating device (C/LUB) is insufficient, the third and fourth solenoid valves SOL3 and SOL 4 are controlled to be turned on.

As such, some of the oil pressure generated from the electric oil pump EOP is supplied to the second passage 14 through the second check valve CV2 through the first switch valve EOP-SW1 to assist the torque converter pressure. The oil pressure supplied to the second switch valve EOP-SW2 is supplied to the cooling/lubrication portion C/LUB through the ninth oil passage 28 according to a changeover of the passage of the second switch valve EOP-SW2.

In the instant case, when it is determined that the oil pressure supplied to the cooling/lubrication portion C/LUB is sufficient, the fourth solenoid valve SOL4 is controlled to be off so that the oil pressure of the eighth passage 28 may be interrupted in the second switch valve EOP-SW2 so as not to be supplied to the cooling/lubrication portion C/LUB.

In FIGS. 2 and 4, the oil pressure flow downstream of the torque converter lock-up clutch control valve TCLCV is not illustrated because the oil pressure of the second passage may be supplied to the lock-up clutch operating side chamber WC and the lock-up clutch non-operating side chamber NWC of the torque converter TC according to the control condition of the torque converter lock-up clutch control valve TCLCV.

Figure 5:
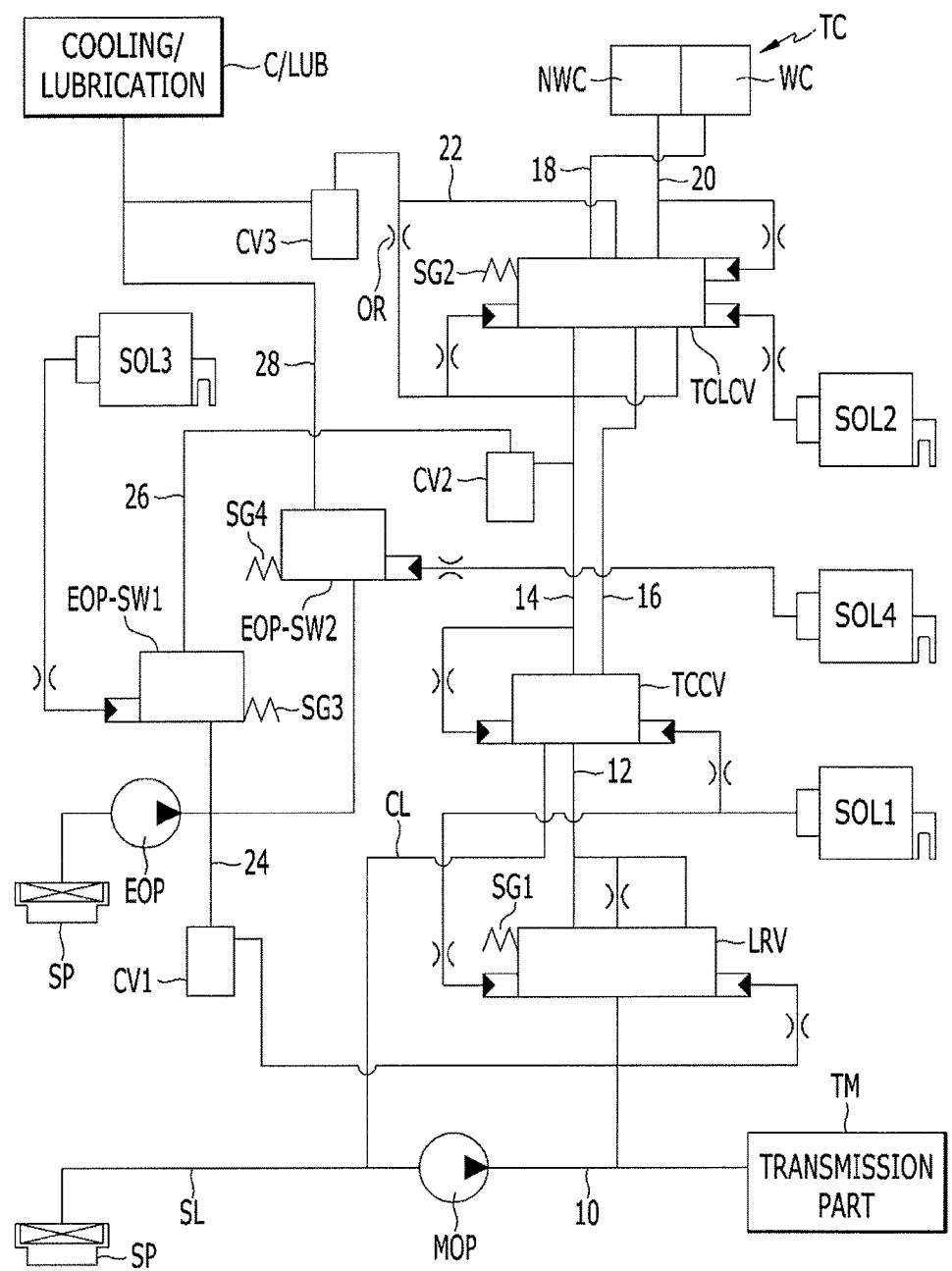
FIG. 5 is an oil pressure circuit diagram of an oil pressure supply system according to various exemplary embodiments of the present invention.

FIG. 5 is an oil pressure circuit diagram of an oil pressure supply system according to various exemplary embodiments of the present invention.

Referring to FIG. 5, the oil pressure supply system according to the various exemplary embodiments of the present invention is configured similarly to the oil pressure supply system according to the various exemplary embodiments of the present invention, except for a path of the oil pressure to be supplied from the electric oil pump EOP to type second switch valve EOP-SW2.

In the various exemplary embodiments of the present invention, the oil pressure supplied to the eighth passage 26 via the first switch valve EOP-SW1 may be configured to be selectively supplied to the cooling/lubrication portion C/LUB according to the control condition of the second switch valve EOP-SW2, but in the various exemplary embodiments of the present invention, the oil pressure of the seventh passage 24 generated by the electric oil pump EOP may be configured to be directly supplied to the second switch valve EOP-SW2.

As a result, since the various exemplary embodiments differs from the various exemplary embodiments only in the path of the oil pressure supplied to the second switch valve EOP-SW2, but the other configurations and operations are the same as those of the various exemplary embodiments of the present invention, a detailed description thereof will be omitted.

As described above, in the oil pressure supply system of an automatic transmission for a vehicle according to the exemplary embodiment of the present invention, during a flow rate insufficiency section of the mechanical oil pump by low-speed driving or when a driving load of the mechanical pump increases while the oil pressure is excessively generated from the mechanical oil pump due to high-speed driving, the driving load of the mechanical oil pump is reduced by recirculating some of the oil pressure supplied from the mechanical oil pump and insufficient oil pressure is assisted by driving the electric oil pump to stably supply the oil pressure and reduce driving loss of the mechanical oil pump, thereby enhancing the fuel efficiency.

Furthermore, the oil pressure supply system of an automatic transmission for a vehicle according to the exemplary embodiment of the present invention assists the pressure of the torque converter by the oil pressure of the electric oil pump when the pressure of the torque converter is insufficient (medium RPM region and high-pressure region of the line pressure) to reduce a capacity of the mechanical oil pump, thereby enhancing the fuel efficiency.

Furthermore, the oil pressure supply system of an automatic transmission for a vehicle according to the exemplary embodiment of the present invention may assist insufficient cooling and lubricating flow rate with the oil pressure of the electric oil pump when the control pressure and the pressure of the torque converter are formed, but the cooling and lubricating flow rate is insufficient to reduce the capacity of the mechanical oil pump, enhancing the fuel efficiency and enhancing durability of the automatic transmission.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An oil pressure supply system of an automatic transmission for a vehicle, comprising:
   a mechanical oil pump driven by an engine, and pumping oil stored in a sump by oil pressure and discharging a pumped oil pressure to a line pressure passage connected to the mechanical oil pump;
   a line regulator valve connected to the line pressure passage and controlling the oil pressure supplied through the line pressure passage and supplying a controlled oil pressure to a first passage connected to the line regulator valve;
   a torque converter control valve connected to the first passage and controlling the oil pressure supplied through the first passage and supplying the controlled oil pressure to second and third passages connected to the torque converter control valve;
   a torque converter lock-up clutch control valve connected to the second and third passages and selectively changing a passage to supply the oil pressure supplied through the second passage and supply the oil pressure through the third passage to a cooling/lubrication portion through a sixth passage connected to the torque converter lock-up clutch control valve;
   an electric oil pump pumping the oil stored in the sump at the oil pressure and discharging the oil stored in the sump to a seventh passage;
   a first switch valve disposed on the seventh passage to selectively opening or closing the oil pressure supplied to an eighth passage connected to the first switch valve;
   a second switch valve selectively supplying a portion of the oil pressure supplied to the eighth passage connected to the second switch valve to the cooling/lubrication portion through a ninth passage connected to the second switch valve,
   wherein the seventh passage is connected to the line pressure passage through a first check valve,
   wherein the eighth passage is connected to the second passage through a second check valve, and
   wherein the sixth passage is joined with the second passage and connected to the ninth passage through a third check valve.

2. The oil pressure supply system of claim 1, wherein the line regulator valve is a spool valve and is connected to be controlled by a feedback oil pressure of the line pressure passage, which is applied to an end portion thereof, and a control pressure of a first solenoid valve and an elastic force of an elastic member, which are applied to an opposite side against the feedback oil pressure of the line pressure passage.

3. The oil pressure supply system of claim 1, wherein the torque converter control valve is a spool valve, and is connected to control the oil pressure while recirculating the portion of the oil pressure supplied through the first passage to a suction passage connected to the mechanical oil pump through a recirculation passage so that a valve spool of the torque converter control valve moves horizontally by a control pressure of a first solenoid valve, which is applied to an end portion thereof, and a feedback oil pressure of the second passage, which is applied to an opposite side against the control pressure of the first solenoid valve.

4. The oil pressure supply system of claim 2, wherein the first solenoid valve is an N/L type variable control solenoid valve in which the oil pressure is not formed in a normal state.

5. The oil pressure supply system of claim 1, wherein the torque converter lock-up clutch control valve is a spool valve, and is connected to be controlled by a control pressure of a second solenoid valve and a feedback oil pressure of the fifth passage, which are applied to an end portion thereof and the oil pressure of the second passage and an elastic force of an elastic member, which are applied to an opposite side against the control pressure of the second solenoid valve and the feedback oil pressure of the fifth passage.

6. The oil pressure supply system of claim 5, wherein the second solenoid valve is an N/L type variable control solenoid valve in which the oil pressure is not formed in a normal state.

7. The oil pressure supply system of claim 1, wherein the first switch valve is a spool valve, and is connected to be controlled by a control pressure of a third solenoid valve, which is applied to an end portion thereof and an elastic force of an elastic member disposed at an opposite side against the control pressure of the third solenoid valve.

8. The oil pressure supply system of claim 7, wherein the third solenoid valve is an N/L type on/off solenoid valve in which the oil pressure is not formed in a normal state.

9. The oil pressure supply system of claim 1, wherein the second switch valve is a spool valve, and is connected to be controlled by a control pressure of a fourth solenoid valve, which is applied to an end portion thereof and an elastic force of an elastic member disposed at an opposite side against the control pressure of the fourth solenoid valve.

10. The oil pressure supply system of claim 9, wherein the fourth solenoid valve is an N/L type on/off solenoid valve in which the oil pressure is not formed in a normal state.

11. The oil pressure supply system of claim 1,
    wherein the first check valve is connected to permit an oil pressure flow supplied from the seventh passage to the line pressure passage,
    wherein the second check valve is connected to permit the oil pressure flow supplied from the eighth passage to the second passage, and
    wherein the third check valve is connected to permit the oil pressure flow supplied from the sixth passage to the ninth passage.

12. The oil pressure supply system of claim 1, wherein an orifice is disposed at a point on the second passage before the second passage and the eighth passage are coupled to each other.

13. The oil pressure supply system of claim 1, wherein the second switch valve is connected to selectively supply the portion of the oil pressure supplied to the seventh passage to the cooling/lubrication portion through the ninth passage.

14. The oil pressure supply system of claim 13, wherein the second switch valve is a spool valve, and is connected to be controlled by a control pressure of a fourth solenoid valve, which is applied to an end portion thereof and an elastic force of an elastic member disposed at an opposite side against the control pressure of the fourth solenoid valve.

\* \* \* \* \*